United States Patent [19]
Korhonen

[11] Patent Number: 5,446,772
[45] Date of Patent: Aug. 29, 1995

[54] INTEGRATED CIRCUIT BUS

[75] Inventor: Veijo Korhonen, Oulu, Finland

[73] Assignee: Nokia Mobile Phones Ltd., Salo, Finland

[21] Appl. No.: 130,592

[22] Filed: Oct. 1, 1993

[30] Foreign Application Priority Data

Oct. 9, 1992 [FI] Finland ................................ 924588

[51] Int. Cl.6 ........................ H04B 3/00; H04T 3/02
[52] U.S. Cl. ........................ 375/257; 365/69; 370/6; 370/85.1
[58] Field of Search ........... 375/36, 22, 23; 365/69, 365/233; 370/6, 124, 85.1; 395/275

[56] References Cited

U.S. PATENT DOCUMENTS

| 4,736,367 | 4/1988 | Wroblewski | 370/85 |
| 4,920,532 | 4/1990 | Wroblewski | 370/85.1 |
| 4,945,267 | 7/1990 | Galbraith | 307/571 |
| 5,210,846 | 5/1993 | Lee | 395/425 |
| 5,266,833 | 11/1993 | Capps | 257/690 |

FOREIGN PATENT DOCUMENTS 924588  5/1993  Finland .

Primary Examiner—Edward L. Coles, Sr.
Assistant Examiner—Madeleine Av Nguyen
Attorney, Agent, or Firm—Perman & Green

[57] ABSTRACT

An integrated circuit bus for the transmission of a serial data signal, to be used in integrated circuits, wherein the data is clocked only to one addressed register, and thus cross-talk is reduced. In the bus all information signals are contained in one signal. The data transmission is based on pulses of different lengths corresponding to different states.

6 Claims, 6 Drawing Sheets

INTEGRATED CIRCUIT BUS

The present invention relates to an integrated circuit bus.

BACKGROUND OF THE INVENTION

Prior art bus structures comprise inputs for three signals which are used for the transmission of serial data, the bus having in addition to the data (DATA) and clock (CLK) lines a signal (SLE) indicating the end of data transmission. During the transmission the rising or falling edge of the clock line (CLK) clocks the data (DATA).

After the last bit the state of the SLE line is changed for a moment. The last bits of the data are an address indicating to which register the data shall be transmitted. Because the address bits are the last bits, the data must be first clocked into all registers, and the SLE triggers the data into the addressed register. The clock line must be connected to all registers at different locations of the integrated circuit (IC), whereby the line will be long and will easily cream cross-talk.

Cross-talk is the coupling of a (digital) signal into another signal, to the supply voltage or to the earth level. It is particularly inconvenient in phase locked loop (PLL) frequency synthesis, because the cross-talk appears as interference in the spectrum of the Voltage Controlled Oscillator (VCO), and thus also as a spurious response in the transmission branch (Tx).

Previously the cross-talk was not particularly inconvenient, as the PLL IC had only 2 to 3 registers, and it was possible to locate them so that there was a minimum of cross-talk. Moreover, in analog mobile phone systems it was possible to have a stronger filtering of the VCO control voltage, which experienced cross-talk from the data transmission clock signal, than in digital systems (there is a longer channel switch-over period, which depends on the bandwidth of the filter). When the degree of integration increases the circuits will be larger, the number of registers in one IC will increase and they can no longer be located so as to have sufficiently low cross-talk.

The prior art bus solution requires three signals and thus also three pins of the microcircuit. The size of the housing could be reduced and also the area of the microcircuit would be reduced (in a pad restricted circuit), if the number of the circuit's Input/Output (I/O) signals could be reduced.

European patent application EP 0 390 978 presents a prior art solution. In this patent application data can be transmitted in both directions. However, the solution utilizes a data format with a packet structure, which substantially limits the use of the invention. The invention also uses pulse width modulation with only two levels.

SUMMARY OF THE INVENTION

According to the present invention there is provided an integrated circuit bus for the transmission of a serial data signal comprising address bits and data bits, the bus comprising a signal termination (SLE) line, means to clock, transform and decode the address bits of the serial data signal means to connect only one clock and data line to the address register, and means to change the state of the SLE line, when data is clocked into the register, after the clocking of the address.

An advantage of the present invention is the provision of a bus structure for the clocking of serial data which addresses the above mentioned disadvantages and problems.

BRIEF DESCRIPTION OF THE DRAWINGS

An embodiment of the invention is now described, by way of example, with reference to the accompanying drawings, in which.

DETAILED DESCRIPTION OF THE INVENTION

Figure 1:
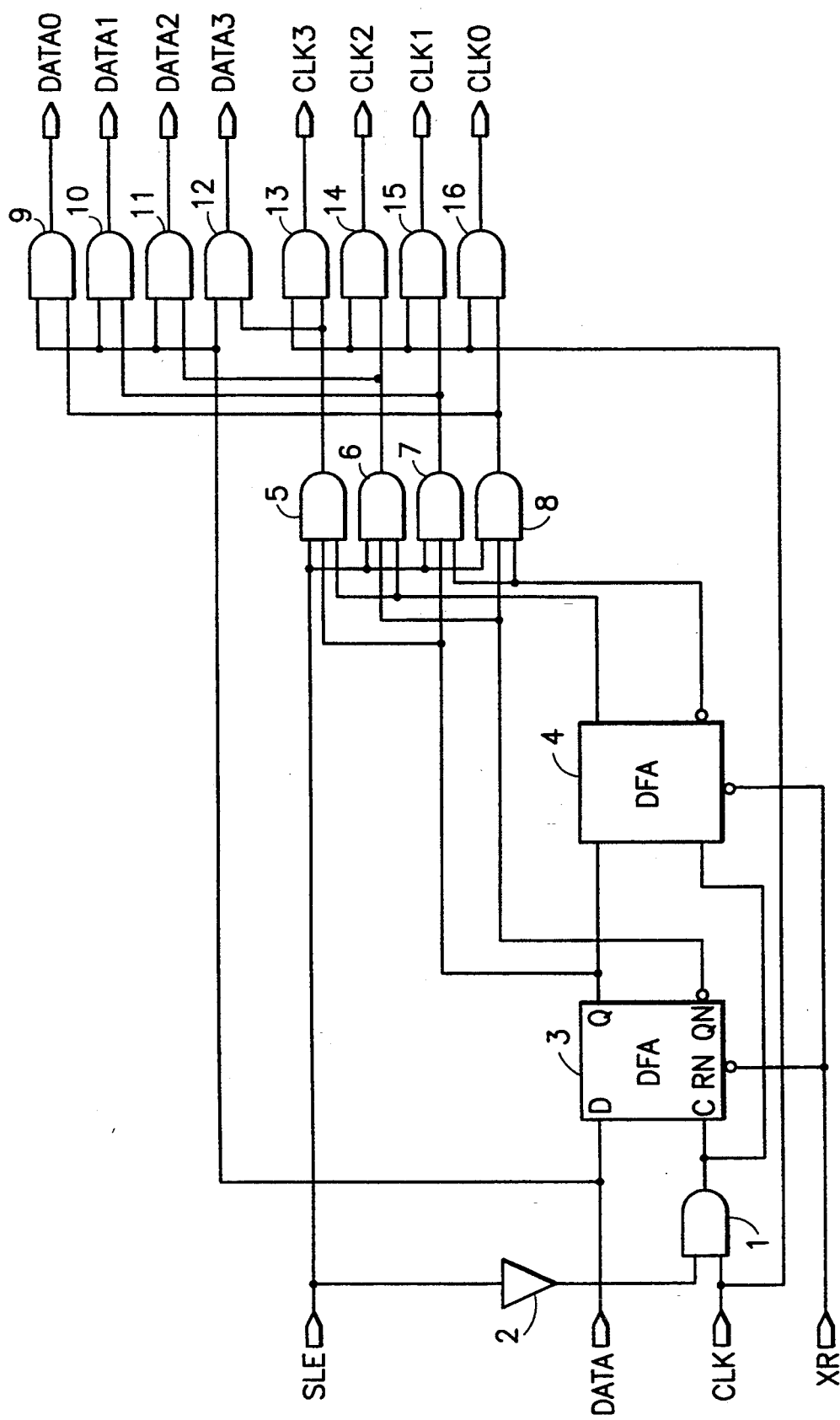
FIG. 1 shows a circuit diagram of the serial bus structure in accordance with the invention.

FIG. 1 is a circuit diagram of a serial bus structure in accordance with the invention, which substantially prevents cross-talk. In the circuit an AND gate 1 receives the SLE pulse via an inverter 2 and receives the CLK pulse directly. The register address is supplied through the flip-flops 3 and 4 to the AND gates 5 to 8. The clock pulses corresponding to the data lines are generated with the aid of the AND gates 13 to 16.

The address bits are first clocked to the flip-flops 3 and 4, and thereafter SLE is raised. Hereby the AND gate 1 prevents the clock signal from reaching flip-flops 3 and 4 and one of the outputs from AND gates 5, 6, 7 and 8 changes its state from 0 to 1, according to the address bits to flip-flops 3 and 4. With the outputs of AND gates 5, 6, 7 and 8 the data and clock lines of the addressed register are selected with the help of AND gates 9 to 16.

Figure 2:
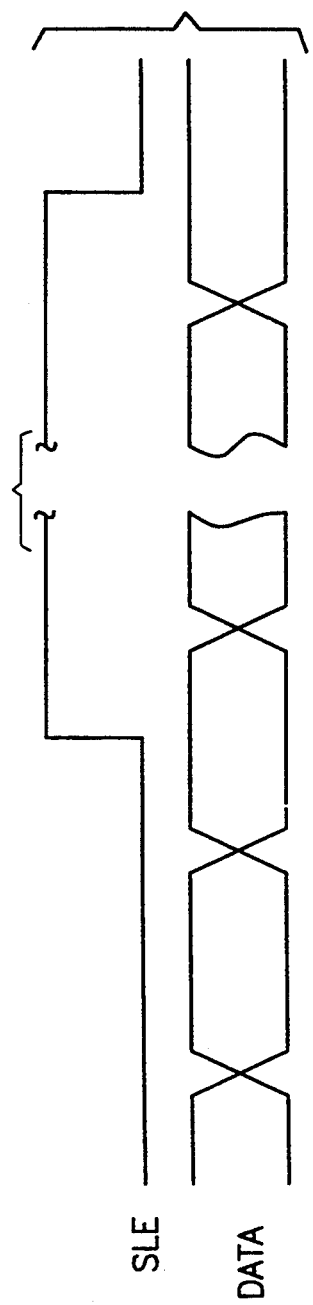
FIG. 2 shows a signal diagram of the serial IC bus in accordance with the invention.

FIG. 2 shows a signal diagram of the serial IC bus in accordance with the invention. In the invention the address is clocked first, and data is clocked only to the addressed register, but not to all registers at the same time, thereby decreasing cross-talk.

In the bus structure in accordance with the invention the address bits are first clocked, transformed and decoded to the selection logic. Based on the address only one clock and data line connected to the addressed register is selected. When the address has been clocked, the state of the SLE line is changed ("0"—>"1") and the data is clocked to the register. When the data has been clocked, the state of the SLE is changed back ("1"—>"0") or vise versa.

In the bus structure in accordance with the invention data is clocked only to the addressed register, and thus cross-talk of the clock line is reduced.

Figure 3:
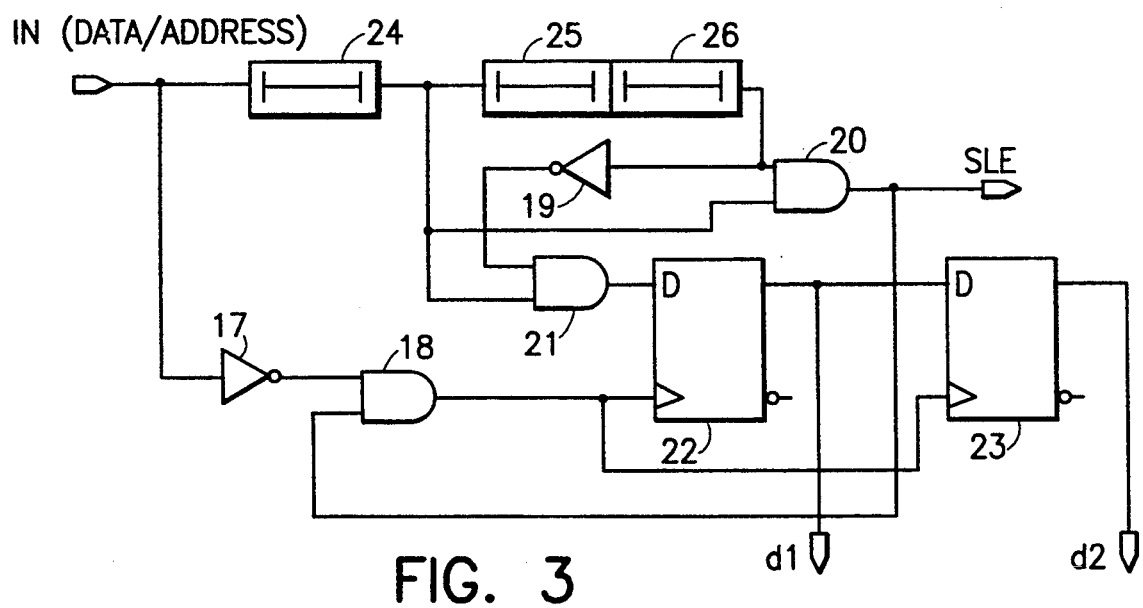
FIG. 3 shows the block diagram of the one-signal serial IC bus in accordance with the invention.

FIG. 3 shows a block diagram of a one-signal serial IC bus in accordance with the invention. The block diagram comprises inverters 17, 19, AND gates 18, 20, 21 and flip-flops 22, 23 and delay block 24–26.

In the bus all information (the CLK, DATA and SLE signals) are included in one signal. The data transmission is based on pulses of different lengths corresponding to the states "0", "1" and SLE. The falling edge of the pulse operates as the clock (CLK). The rising edge of the pulse is delayed in two delay blocks 24–26, and depending on the pulse length or the time between the rising and the failing edge the input of the serial/parallel converter obtains either the pulse "0", "1" or SLE.

The bus in accordance with the invention decreases the number of the I/O signals required in the circuit by using only one line instead of three lines.

The invention may utilize a delay block 24–26. The delay block can be realized e.g. by an inverter chain, by an RC time constant, or by a clocked d-flip-flop chain.

When the IN pulse is shorter than the delay 24 and the output of the delay 26 is in state 0, the DATA signal is 0. When the IN pulse is longer than delay 24, but shorter than 25 and 26, taken together, the data signal will be 1. Clocking of the data bits always takes place when the IN signal goes to state 0. The SLE signal is obtained when the IN pulse width is longer than the added delays of 24, 25 and 26, the outputs of delays 24 and 26 being in state 1.

Figure 4:
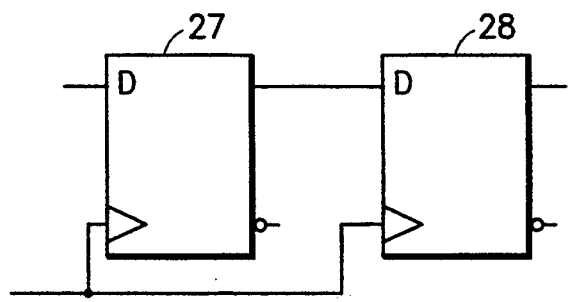
FIG. 4 shows the structure of the delay block of the one-signal serial IC bus in accordance with the invention.

FIG. 4 shows the structure of the delay block of the one-signal serial IC bus in accordance with the invention. The delay block uses a clocked chain of d-flip-flops 27–28. Then the clock signal is obtained either from an external signal (the reference frequency of the synthesizer, etc.) supplied to the circuit, or it must be generated internally, e.g. with a CMOS ring oscillator or with an RC oscillator.

Figure 5:
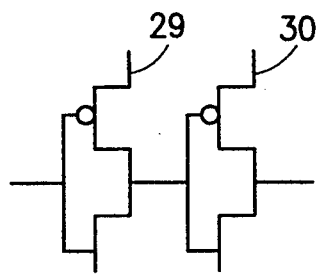
FIG. 5 shows an alternative structure of the delay block of the one-signal serial IC bus in accordance with the invention.

FIG. 5 shows an alternative structure of the delay block of the one-signal serial IC bus. The delay block is realized by an inverter chain 29–30.

The preferred embodiment is a delay block based on a d-flip-flop chain 27–28, because then the stability of the block delay depends on the stability of the clock signal.

Figure 6:
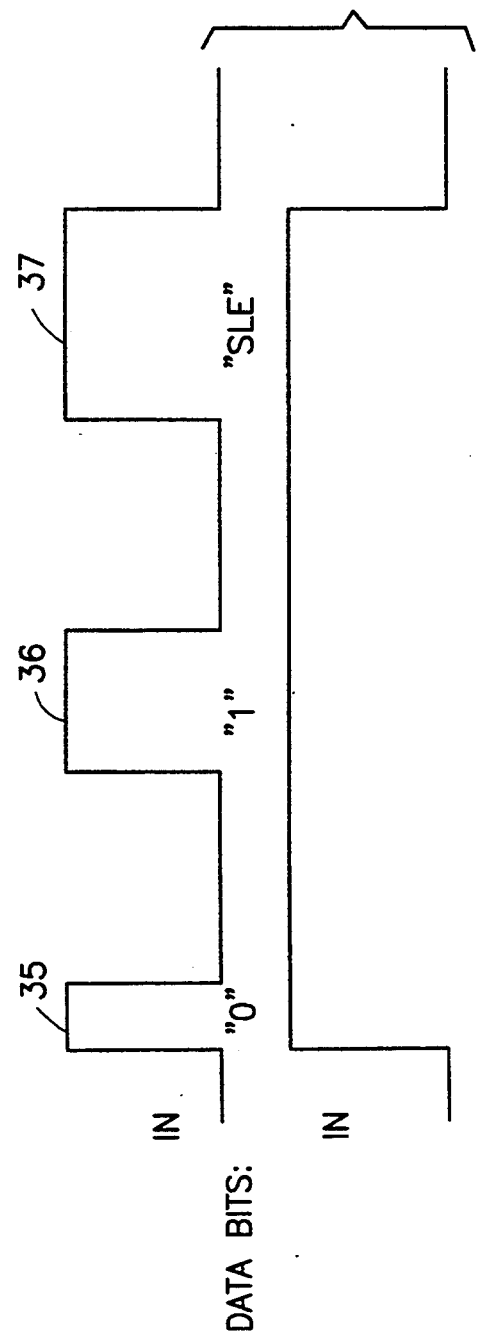
FIG. 6 shows the pulse width modulated signal scheme of the one-signal serial IC bus in accordance with the invention.

FIG. 6 shows a divider signal scheme of a one-signal serial IC bus in accordance with the invention. The data transmission is based on pulses 35–37 of different lengths, corresponding to the states "0", "1" and SLE.

Figure 7:
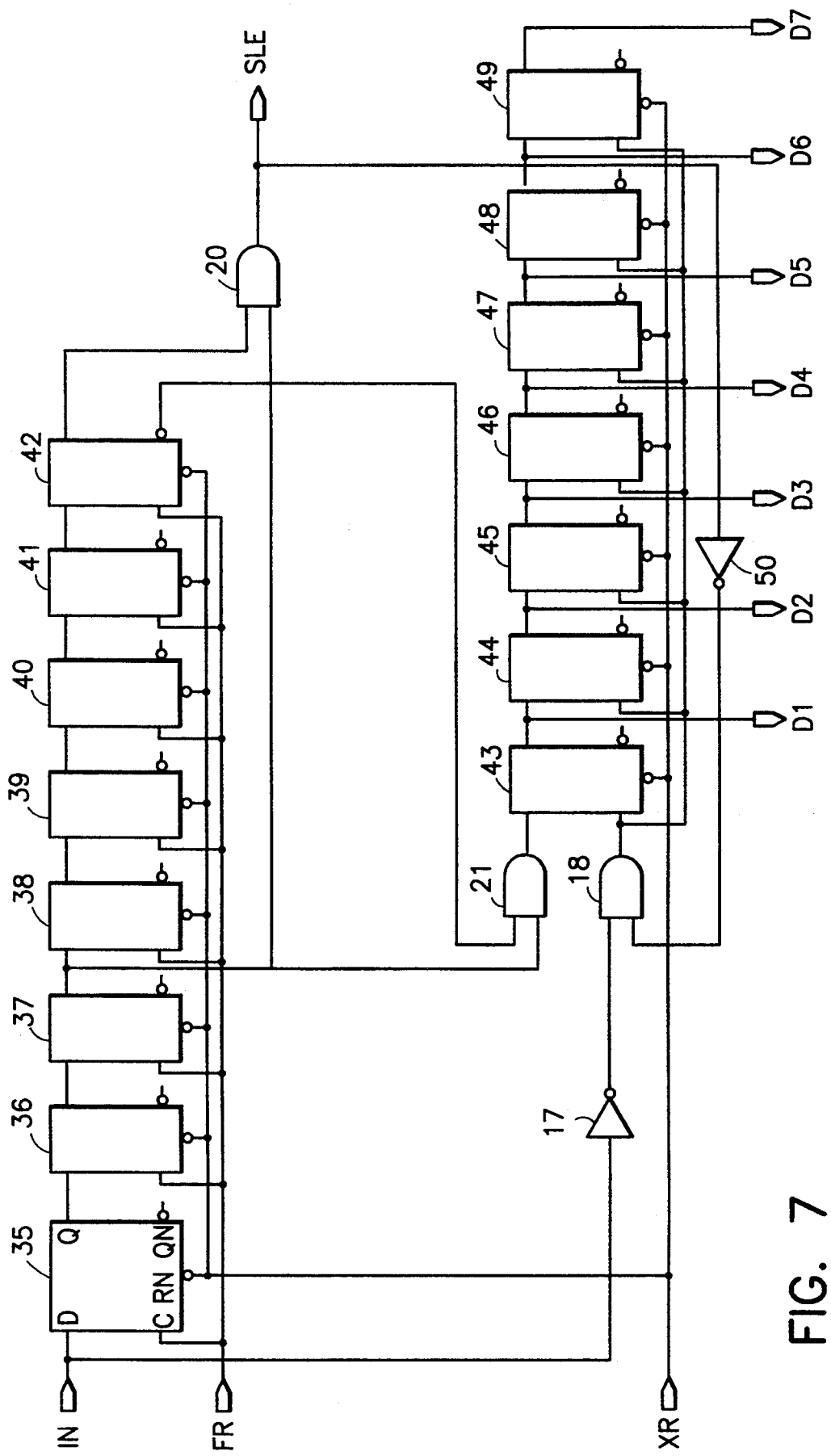
FIG. 7 shows a circuit diagram of the one-signal serial IC in accordance with the invention.

FIG. 7 shows a circuit diagram of a one-signal serial IC bin accordance with the invention. The circuit diagram of the one-signal serial IC bus comprises inverters 17, 50, AND gates 18, 20, 21 and flip-flops 35–49.

Figure 8:
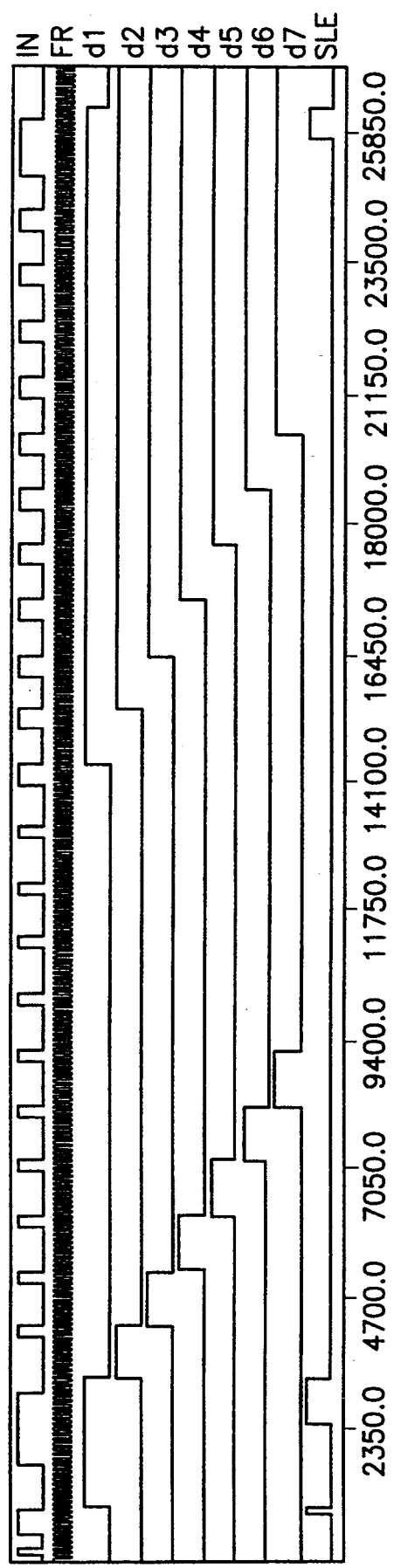
FIG. 8 shows the signal scheme of the one-signal serial IC bus in accordance with the invention.

FIG. 8 shows a signal scheme of the one-signal serial IC bus.

In FIG. 8, in the upper in signal, 0 and 1 pulses appear too close to each other. This has resulted in an erroneous SLE coding and correct change of state from 0 to 1 for d1. Thereafter, a correct SLE signal has been introduced, as can be seen in signal 1e. Thereafter, ten 0 pulses have been introduced, changing from 1 through the whole series to parallel converter. Thereafter, eleven 1 bits appear, all converter outputs going to state 1. Finally, the SLE signal has been introduced, appearing as a change of state in 1e.

Figure 9:
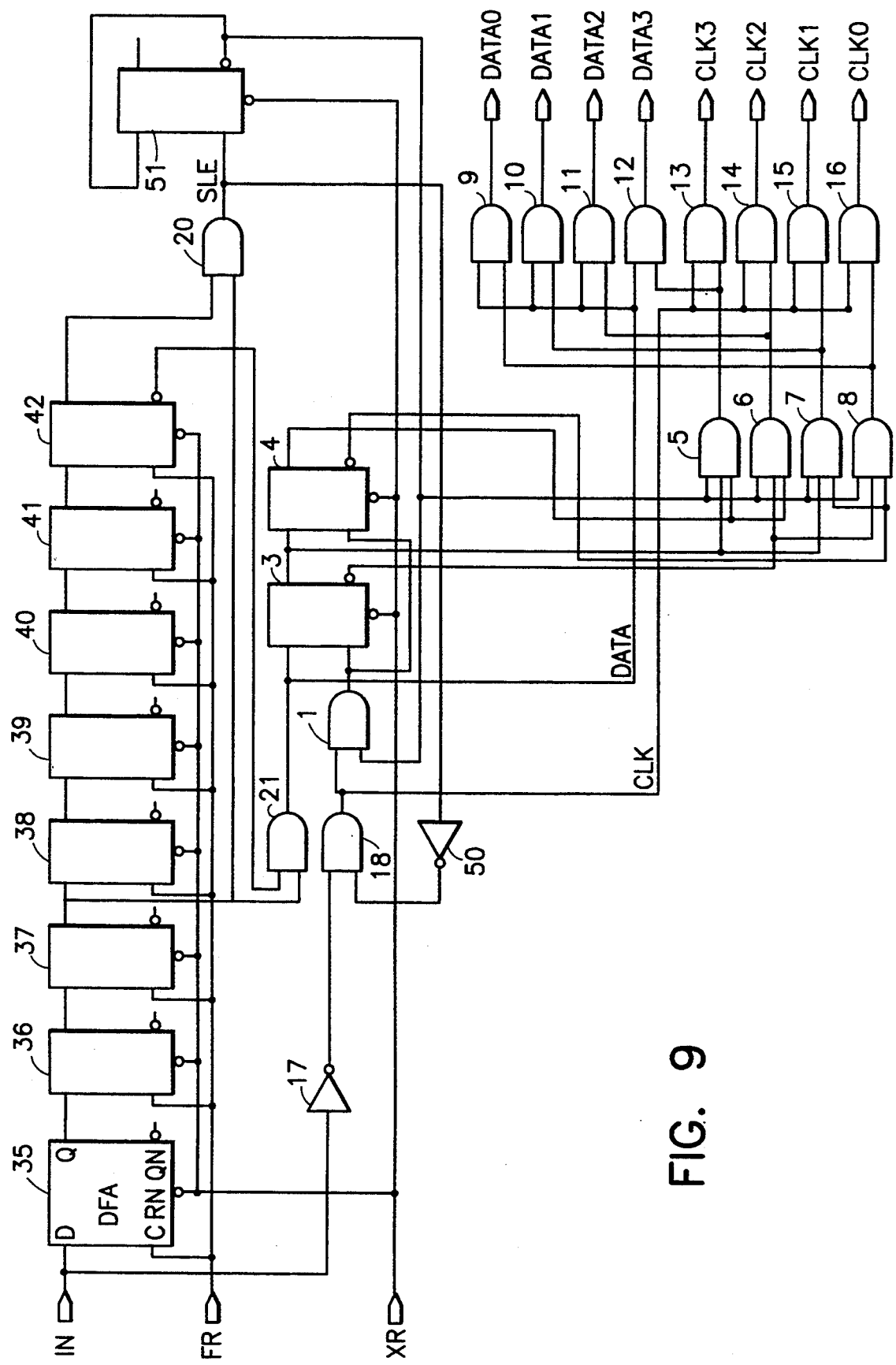
FIG. 9 shows a circuit diagram of the serial IC bus in accordance with the invention, which prevents cross-talk.

In FIG. 9, flip-flop 51 has been inserted as a "memory" for the SLE signal. Thus, the SLE signal is obtained from said flip-flop instead of gate 20 (as in FIG. 3).

FIG. 9 shows a circuit diagram of a serial IC bus in accordance with the invention, which prevents crosstalk. The circuit diagram of the serial IC bus comprises inverters 17, 50, AND gates 1, 5–16, 18, 20, 21 and flip-flops 3, 4, 35–42, 51.

In view of the foregoing it will be clear to a person skilled in the art that modification may be incorporated without departing from the scope of the present invention.

I claim:

1. An integrated bus for transmission of a serial data signal which includes both address bits and data bits, said integrated bus comprising:
   a clock pulse source;
   a plurality of pairs of data lines and clock lines, each pair coupled to a register;
   a signal termination line manifesting first and second states;
   circuit means coupled to said signal termination line and and clock pulse source and responsive to said first state on said signal termination line to clock, transform and decode said address bits;
   logic means coupled to said circuit means and clock pulse source and responsive to decoded address bits to select one pair of said pairs of data lines and clock lines; and
   means for changing said first state on said signal termination line to said second state to enable said data bits to pass to a data line and clock pulses to a clock line of said selected pair of said pairs of data lines and clock lines.

2. A bus as claimed in claim 1, wherein said circuit means includes:
   flip-flops for receiving clocked address bits, and
   gate means for preventing clock signals from reaching said flip-flops upon reception of said clocked address bits, and said logic means includes
   further gate means for selecting the data and clock times for the addressed register according to address bits clocked to said flip-flops.

3. A bus as claimed in claim 2, wherein said circuit means further comprises
   at least two delay block defining at least two predetermined time delays;
   means for comparing a length of an input signal with said time delays; and
   means for controlling states on said signal termination line based on said comparison.

4. A bus as claimed in claim 3, wherein the delay blocks are realized by flip-flops.

5. A bus as claimed in claim 4, wherein the delay blocks are realized by an inverter chain.

6. A bus structure as claimed in claim 1, wherein data transmission is based on pulses of different lengths corresponding to states "0", "1" and to states on said signal termination line.

* * * * *